(12) United States Patent
Kim

(10) Patent No.: US 8,793,622 B2
(45) Date of Patent: Jul. 29, 2014

(54) DEVICE FOR ITEM CONTROL, SYSTEM FOR ITEM CONTROL, AND METHOD

(75) Inventor: Hyoung Jin Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 612 days.

(21) Appl. No.: 12/862,344

(22) Filed: Aug. 24, 2010

(65) Prior Publication Data

US 2011/0191724 A1 Aug. 4, 2011

(30) Foreign Application Priority Data

Jan. 29, 2010 (KR) .................. 10-2010-0008678

(51) Int. Cl.
G06F 15/00 (2006.01)
G06F 13/00 (2006.01)
G06F 3/01 (2006.01)
H04M 1/725 (2006.01)

(52) U.S. Cl.
CPC ........... *G06F 3/017* (2013.01); *H04M 1/72583* (2013.01)
USPC ......................................... 715/863; 715/751

(58) Field of Classification Search
CPC ...................................................... G06F 3/017
USPC ......... 715/763–765, 738–740, 863, 851–853, 715/751–753
See application file for complete search history.

(56) References Cited

U.S. PATENT DOCUMENTS

| 8,373,538 | B1* | 2/2013 | Hildner et al. | .................. 340/3.1 |
| 2003/0098845 | A1* | 5/2003 | Hanson et al. | ................. 345/156 |
| 2007/0239981 | A1 | 10/2007 | Lessing | |
| 2007/0266185 | A1* | 11/2007 | Goddi et al. | ...................... 710/8 |
| 2010/0222112 | A1* | 9/2010 | Han | ............................. 455/566 |

FOREIGN PATENT DOCUMENTS

| JP | 07-231483 | 8/1995 |
| KR | 10-2006-0101964 | 9/2006 |
| KR | 10-2007-0029318 | 3/2007 |
| KR | 10-2008-0029717 | 4/2008 |
| KR | 10-2009-0090086 | 8/2009 |
| WO | 2007/112787 | 10/2007 |
| WO | 2007/124122 | 11/2007 |

OTHER PUBLICATIONS

European Search Report dated Sep. 26, 2011, issued for European Application No. 10188003.7.

* cited by examiner

*Primary Examiner* — Kevin Nguyen

(74) *Attorney, Agent, or Firm* — H.C. Park & Associates, PLC

(57) ABSTRACT

A first device classifies and displays an item, identifies a suitable class matched to approach information of a second device out of the entire area of the classified item as the second device approaches the first device, and provides the second device with the identified class or executes a service linked to the class. The second device approaches a portion where a desired class is displayed by the first device, receives the class from the first device, and provides a linked service using the same.

23 Claims, 14 Drawing Sheets

(a)

(b)

(c)

(a)

(b)

(c)

(a)

(b)

DEVICE FOR ITEM CONTROL, SYSTEM FOR ITEM CONTROL, AND METHOD

CROSS-REFERENCE TO RELATED APPLICATION

This application claims priority from and the benefit of Korean Patent Application No. 10-2010-0008678, filed on Jan. 29, 2010, which is hereby incorporated by reference for all purposes as if fully set forth herein.

BACKGROUND

1. Field

This disclosure relates to a device including a display screen and a control method thereof.

2. Discussion of the Background

As wired/wireless communication technologies have been developed, personal devices have been popularized. Functions provided by such devices have grown and various is linked services are provided. Recently, mobile phones, PDAs, and smart phones that provide a calling function, and video players, music players, and navigation devices with which one can enjoy multimedia content, such as music and movies, are being widely supplied.

A technology for identifying a position of a device using an optical sensor or an ultrasonic sensor is being applied to some linked services. However, since such existing technology adopts a method of sensing motion of a moving object and recognizing the position of the object, such technology is limited to an applicable region.

Further, to reproduce content on a device, a user may be required to connect the device to an apparatus in which the content is registered, search/select his or her desired content through user interfaces, and store them before reproduction, or a user may be required to access a wired/wireless Internet server to download the desired content.

SUMMARY

Exemplary embodiments of the present invention provide devices for item control including a user's interface to utilize a position recognition when controlling items, a system for item control using the same, and a method thereof.

Exemplary embodiments of the present invention provide devices for item control capable of extending a transmission region to physical data, such as information on a state of a battery, in addition to software data, a system for item control using the same, and a method thereof.

Exemplary embodiments of the present invention provide devices for item control capable of automatically optimizing whether the items should be provided depending on a result of position recognition, a system for item control using the same, and a method thereof.

Additional features of the invention will be set forth in the description which follows, and in part will be apparent from the description, or may be learned by practice of the invention.

An exemplary embodiment provides a device, including a display to display an item classified into a plurality of areas; and an operation controller to classify the item, to match a class of the classified item with approach information of an outside device, and to execute a service linked to the matched class.

An exemplary embodiment provides a device, including an interface to select an area of a classified item by an approach motion toward an outside device displaying the classified item, and to receive a class matched to the selected area from the outside device; a linked service controller to provide a linked service using the received class; and a display to display the received class.

An exemplary embodiment provides an item control system, including a first device to select and receive a class of a classified item by an approach motion; and a second device to classify the item, to display the classified item, and to execute a service linked to a class matched to approach information of the first device as the first device approaches the second device, wherein the class of the classified item corresponds to an area of the classified item as displayed by the second device.

An exemplary embodiment provides a method for item control, including classifying an item into a plurality of areas; displaying the classified item; determining approach information of an outside device as the outside device approaches; identifying a selected area matched to the approach information of the outside device out of the entire area of the classified item; and executing a service linked to the selected area.

An exemplary embodiment provides a method for item control, including generating approach information on an outside device by approaching the outside device, the outside device displaying a classified item; receiving a class of a selected area of the classified item matched to the approach information out of the entire area of the classified item from the outside device; and providing a linked service according to the received class.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
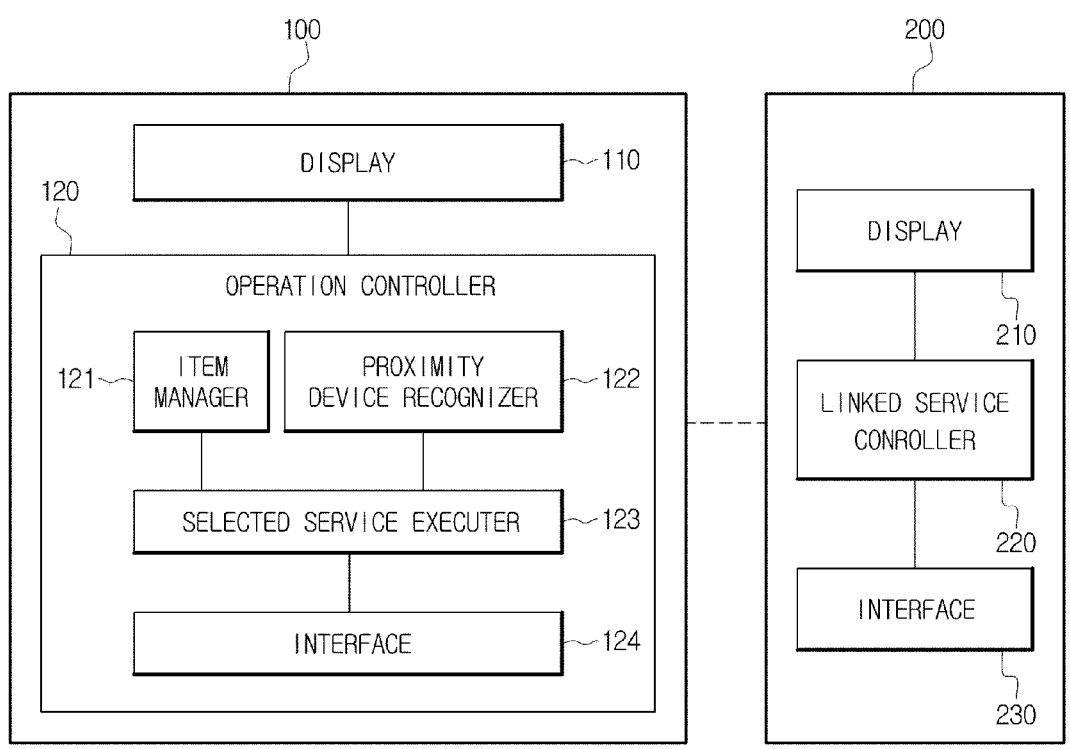
FIG. 1 is a block diagram showing a system for item control including first and second devices according to an exemplary embodiment.

DETAILED DESCRIPTION OF THE
ILLUSTRATED EMBODIMENTS

Exemplary embodiments now will be described more fully hereinafter with reference to the accompanying drawings, in which exemplary embodiments are shown. This is disclosure may, however, be embodied in many different forms and should not be construed as limited to the exemplary embodiments set forth therein. Rather, these exemplary embodiments are provided so that this disclosure will be thorough, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly is formal sense unless expressly so defined herein.

In the drawings, like reference numerals denote like elements. The shape, size, and regions, and the like, of the drawing may be exaggerated for clarity.

FIG. 1 is a block diagram showing a system for item control including a first device 100 and a second device 200 according to an exemplary embodiment. The first device 100 senses an approach of the second device 200 and provides items, such as software data including file data, image data, video data, and audio data; a command object; an application screen component, and the like, or physical data including information on a state of a device. The first device 100 may be any kind of device capable of displaying items and transmitting items through communication, including an embedded device of a personal computer, a PDA, a mobile phone, a smart phone, and a hand-held computer. The first device 100 may provide various items and functions on a screen of a display 110 through user interfaces of various applications. For example, the first device 100 classifies items into classes, stores the classified items, and displays the classified items. Each class of a classified item corresponds to an area of the item as the item is displayed. The second device 100 executes a service linked to a selected area of the displayed, classified item matched to approach information of the second device 200 out of the entire area of the classified items.

The first device 100 generally includes the display 110 and an operation controller 120. The display 110 includes a screen under the control of the operation controller 120 and displays various items and functions depending on situations. For example, the display 110 displays the items classified into a plurality of areas on the screen.

The operation controller 120 divides and classifies the items and displays them through the display 110. Further, the operation controller 120 senses or determines whether the is second device 200 approaches and determines approach information of the approaching second device 200. Also, the operation controller 120 executes a service linked to an area of the classified item matched to the approach information of the second device 200 out of the entire area of the classified item displayed on the display 110. For example, at least one class of the classified item displayed on the display 110 is matched to the approach information of the second device 200 and transmitted to the second device 200.

The approach information of the second device 200 is used to select a class corresponding to a specific area out of an entire area of the classified item on the screen of the first device 100. For example, the approach information may be position, distance, approach direction, moving path, angle, entering speed, entering area, and the like. For example, when a class selected by a user is identified on the basis of the approach direction, the second device 200 may move from left to right on the screen of the first device 100 and/or it moves in the reverse direction. In this case, the first device 100 may recognize that a different class is selected for each motion.

The operation controller 120 includes an item manager 121, a proximity device recognizer 122, a selected service executor 123, and an interface 124.

The item manager 121 divides various kinds of items into a plurality of classes, stores the items, and displays the classified items on the display 110. Each item may be classified according to a request of an application.

The proximity device recognizer 122 includes an optical or ultrasonic sensor and determines whether there is an approaching device. If the second device 200 approaches the first device 100, the proximity device recognizer 122 determines the approach information by recognizing position or distance of the second device 200 and/or sensing motion of the second is device 200, and provides the selected service executor 123 with the approach information.

The selected service executor 123 identifies one or more classes positioned on or associated with the selected area matched to the approach information of the second device 200 out of the entire area of the classified item displayed on the display 110, and provides a service linked to the identified class.

For example, the selected service executor 123 searches for the class corresponding to an area that is matched to a current position of the second device 200 out of the entire area of the classified item displayed on the display 110. Then, the selected service executor 123 provides the second device 200 with the searched class through the interface 124. Otherwise, the selected service executor 120 executes an object command corresponding to the searched class and changes a display state of the display 110.

The second device 200 approaches the first device 100 to receive a portion of or information of the classified item. For example, second device 200 may be a PDA, a mobile phone, or a smart phone. The second device 200 selects a class corresponding to an area out of the entire area of the classified item by the approach motion relative to the first device 100 that is displaying the classified item, and receives the class matched to the selected area.

The second device 200 includes a display 210, a linked service controller 220, and an interface 230.

The display 210 includes a screen under the control of the linked service controller 220 and, for example, visually displays the class obtained from the first device 100 depending on situations. The linked service controller 220 displays the class received through the interface 230 on the display 210 and/or provides a linked service (for example, a magnified display and a partial reproduction of the received selected area) using the relevant class.

The type of the linked service using the received class may be determined by a property of the relevant class, a current mode of the second device 200, or an application executed on the second device 200. For example, if some portion of an image is received from the first device 100, the linked service controller 220 of the second device 200 may magnify the received image portion. When some portion of video data is received, the linked service controller 220 may reproduce the portion or register the portion in a video album.

The interface 230 receives the class of the area selected by the approach motion of the second device via communication with the interface 124 in the first device 100, and transfers the received class to the linked service controller 220.

Figure 2:
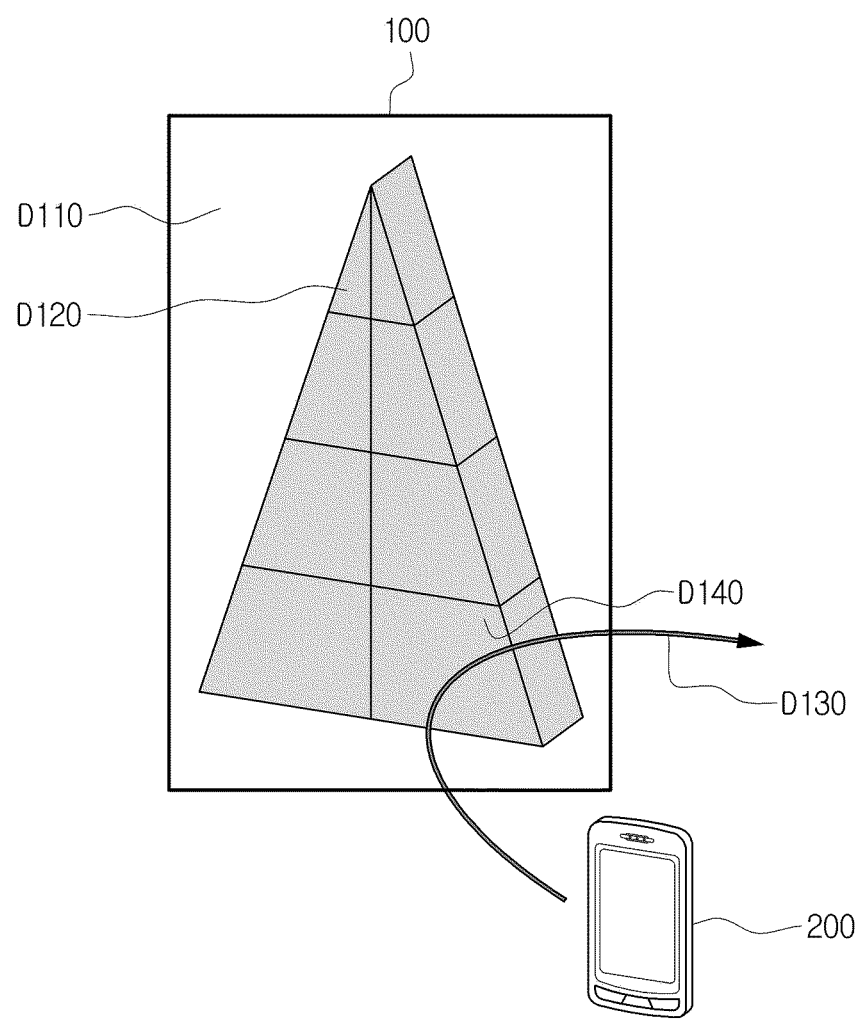
FIG. 2 is a view illustrating an item control motion of devices according to an exemplary embodiment.

FIG. 2 is a view illustrating an item control motion of devices according to an exemplary embodiment.

For example, the class corresponding to an area is selected out of the entire area of the classified item displayed on the first device 100 by matching an area in which the class is displayed in the first device 100 with approach information, such as a position and a distance, of the second device 200.

Referring to FIG. 2, a first device 100 classifies and displays an item D120, and a second device 200 receives a class D140 from the first device 100 using an approach motion. A display area D110 of the first device 100 displays the classified item D120 divided into areas determined by the first device 100. A path or trace D130 through which the second device 200 moves is used to select classes of the classified items D120 of the first device 100, for example, the selected class D140 is the class selected by the second device 200.

The first device 100 classifies and displays the items to be displayed as a 2° D. interface, a 3D interface, a holographic image (for example, contents, such as file data, image data, and video data; command objects, such as menus; and application screen components), or the like. Anything that can be displayed by the first device 100 may be divided and classified into areas, and such information may be stored. Further, the first device 100 recognizes approach information, such as a distance or a position, as the second device 200 approaches the first device 100. The first device 100 transmits one or more classes desired by the user to the second device 200 by matching areas of the classified item to the approach information of the second device 200.

If the second device 200 moves along the path D130, the first device 100 may identify the class D140 matched to the relevant moving path D130 and transmit the class D140 to the second device 200. Otherwise, the first device 100 may provide services (e.g., object command) matched to the class D140 that is selected by the approach motion of the second device 200, or change a display state of the first device 100. The second device 200 may approach the class D140 of the first device 100 and obtain the relevant class D140 and provide a linked service according to the class D140.

Figure 3:
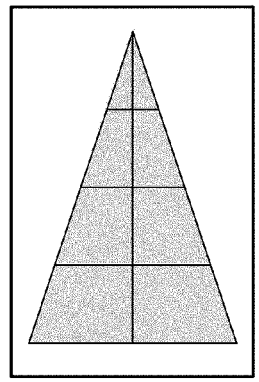
FIG. 3 (a), FIG. 3 (b), FIG. 3 (c), FIG. 4 (a), FIG. 4 (b), and FIG. 4 (c) are views illustrating kinds of item that can be provided by a first device according to an exemplary embodiment.
Figure 3:
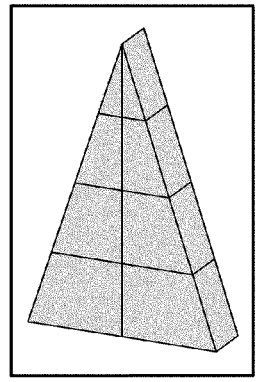
Figure 3:
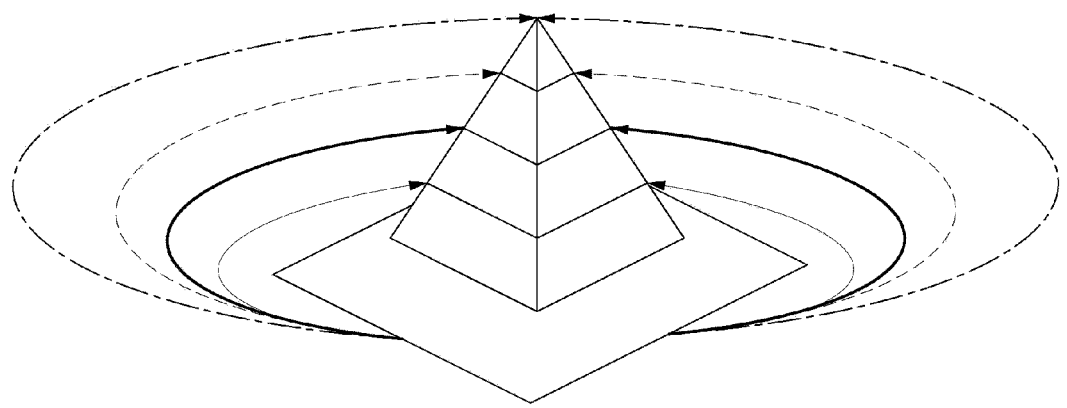
Figure 4:
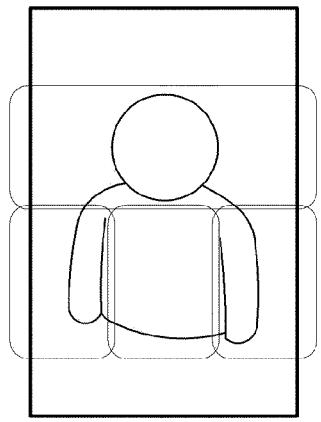
Figure 4:
Figure 4:
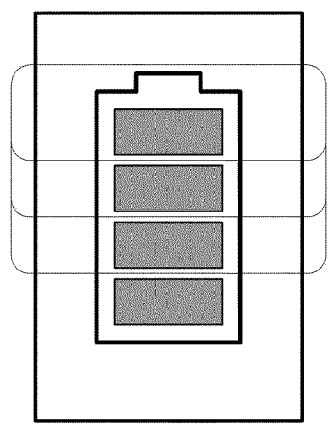

FIG. 3 (*a*), FIG. 3 (*b*), FIG. 3 (*c*), FIG. 4 (*a*), FIG. 4 (*b*), and FIG. 4 (*c*) are views illustrating kinds of items that can be provided by a first device 100 according to an exemplary embodiment. A display environment to which the first device 100 can apply the classification may be 2D and 3D interfaces, as shown in FIG. 3 (*a*) and FIG. 3 (*b*), respectively, as well as a holographic image, as shown in FIG. 3 (*c*). The 2D/3D interface and holographic image may be divided and classified depending on area and distance.

FIG. 3 (*a*) shows a state in which an item displayed on a screen is divided and classified into areas using a 2D interface. In the case of a 3D interface shown in FIG. 3 (*b*), while the item is divided into areas like the 2D interface, a surface viewed in 3D may be totally classified. In the holographic image, as divided by dotted arrows in FIG. 3 (*c*), classification of the relevant items into areas may be performed according to a distance between the displayed item and the second device 200.

Here, the item to which the classification is applied may be software data, including file data, image data, video data, and audio data; a command object; an application screen component, and the like, or physical data including information on a state of a device. For example, the item that is classified by the first device 100 may be any kind of item that can be directly or indirectly displayed through a screen, such as a simple menu, an image, video data, a music playback list, a telephone number list, and a state of a battery.

FIG. 4 (*a*) shows a classified image, and FIG. 4 (*b*) shows a telephone number list classified into areas. Further, it is also possible to classify a state of a battery or the like, i.e., physical data of the first device 100, and express the same in an image, as shown in FIG. 4 (*c*).

Figure 5:
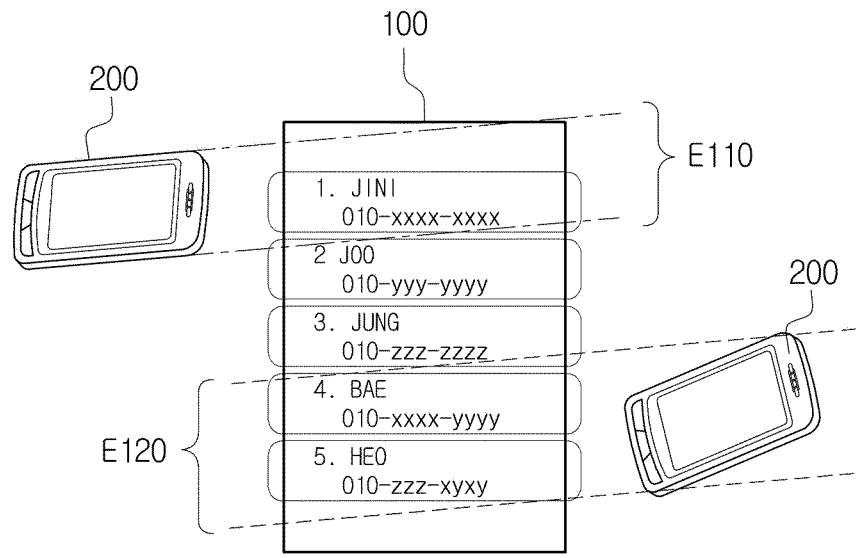
FIG. 5 (a) and FIG. 5 (b) are views illustrating item control motion of devices is according to an exemplary embodiment.
Figure 5:
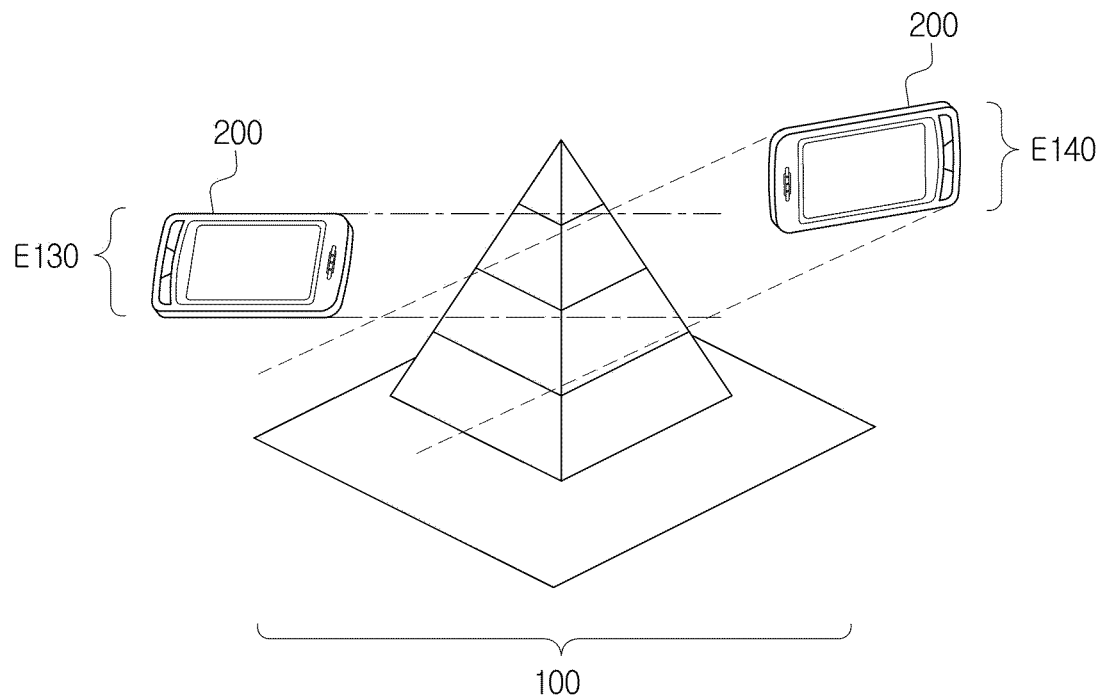

FIG. 5 (*a*) and FIG. 5 (*b*) are views illustrating item control motion of devices according to an exemplary embodiment. The first device 100 may detect approach information, such as angle, distance, and position, of the second device 200 approaching the first device 100, and may match one class or several classes of data at a same time.

FIG. 5 (*a*) is a view illustrating a second device 200 selecting one class of data along a moving path or trace E110 and the second device 200 selecting two classes of data along a moving path E120 from a telephone number list displayed on the screen of the first device 100 through a 2D interface. For example, the user may select one desired telephone number by passing the second device 200 through the selected area on a screen of the first device 100 while the second device 200 is disposed horizontally. Further, the user may select two desired telephone numbers by passing the second device 200 through the selected area on the screen of is the first device 100 while the second device 200 is disposed vertically.

FIG. 5 (*b*) is a view showing the second device 200 selecting one class of data along a moving path E130 and the second device 200 selecting two classes of data along a moving path E140, from a holographic image displayed by the first device 100. In the case of FIG. 5 (*b*), the first device 100 measures position and distance of the second device 200 and determines a moving path of the second device 200. The first device 100 transmits one or more classes associated with the selected area matched to the approach information to the second device 200.

Here, in the case that the second device 200 approaches the first device 100 with an angle or slope to receive multiple data as shown in the moving path E140, the first device 100 measures the first approaching distance of the second device 200, and measures a distance to the second device 200 at a time interval (for example, every 0.1 second) several times, and determines the class selected by the user of the second device 200 using a finally or a subsequently measured approaching distance.

Figure 6:
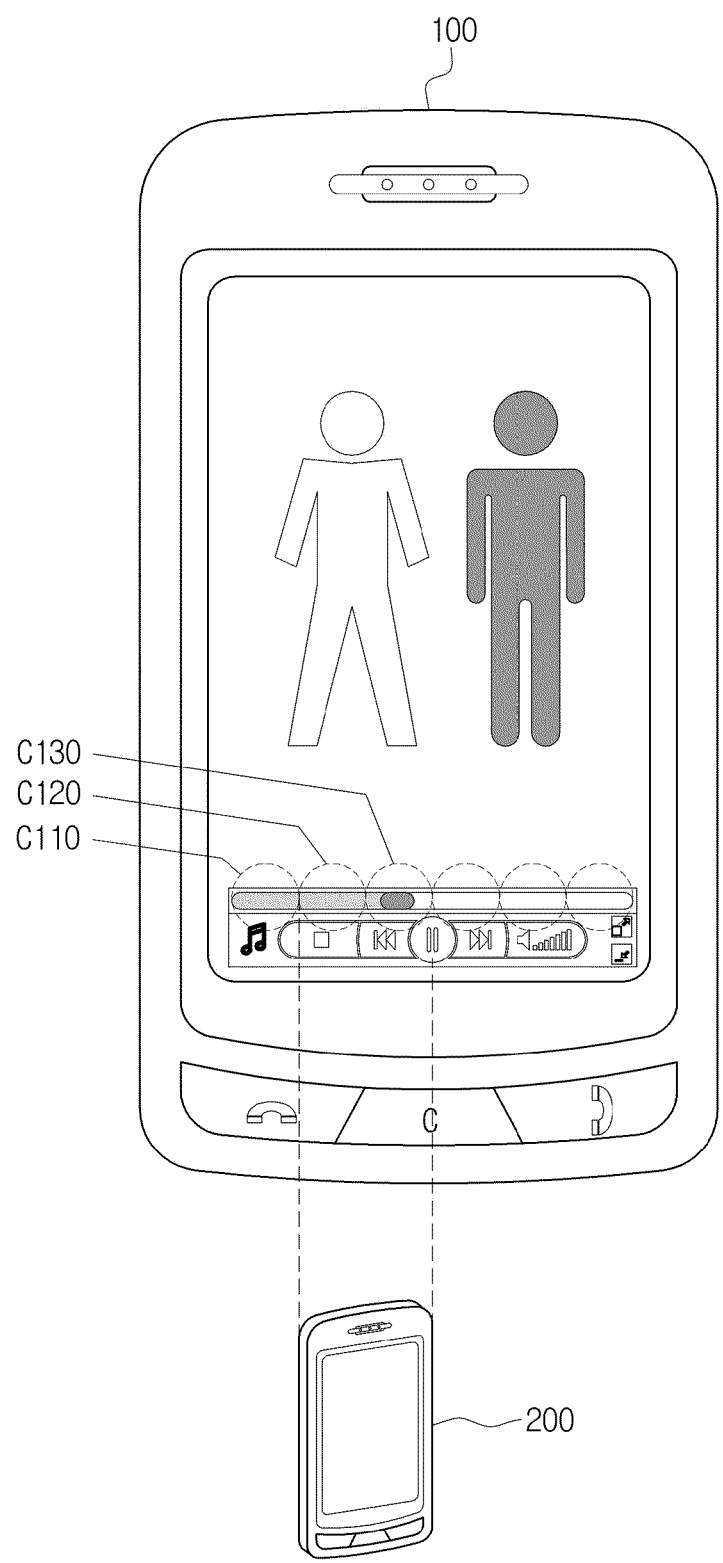
FIG. 6 is a view illustrating item control motion of devices according to an exemplary embodiment.

FIG. 6 is a view illustrating item control motion of devices according to an exemplary embodiment. The first device 100 may divide a progress bar into areas on the screen that reproduces content, such as video data or audio data, and suitably matches some of the files according to an approach position of the second device 200 so as to transmit such matched files to the second device 200.

If content is reproduced by the first device 100, the second device 200 selects a specific area of the progress bar that is being displayed in the first device 100 by the approach motion as shown in FIG. 6. By doing so, the second device 200 selects the specific area of the content being reproduced in the first device 100 so as to receive the selected area of the content, is or plays the relevant content starting from the selected area. For example, in FIG. 6, the progress bar on the screen of the first device 100 is divided into areas of class C110, class C120, class C130, and so on. The second device 200 may select some area of the item by the approaching position, receive only a portion corresponding to the class C120 and the class C130 from the video data that is being reproduced, or reproduce the video data starting from the relevant portion.

Figure 7:
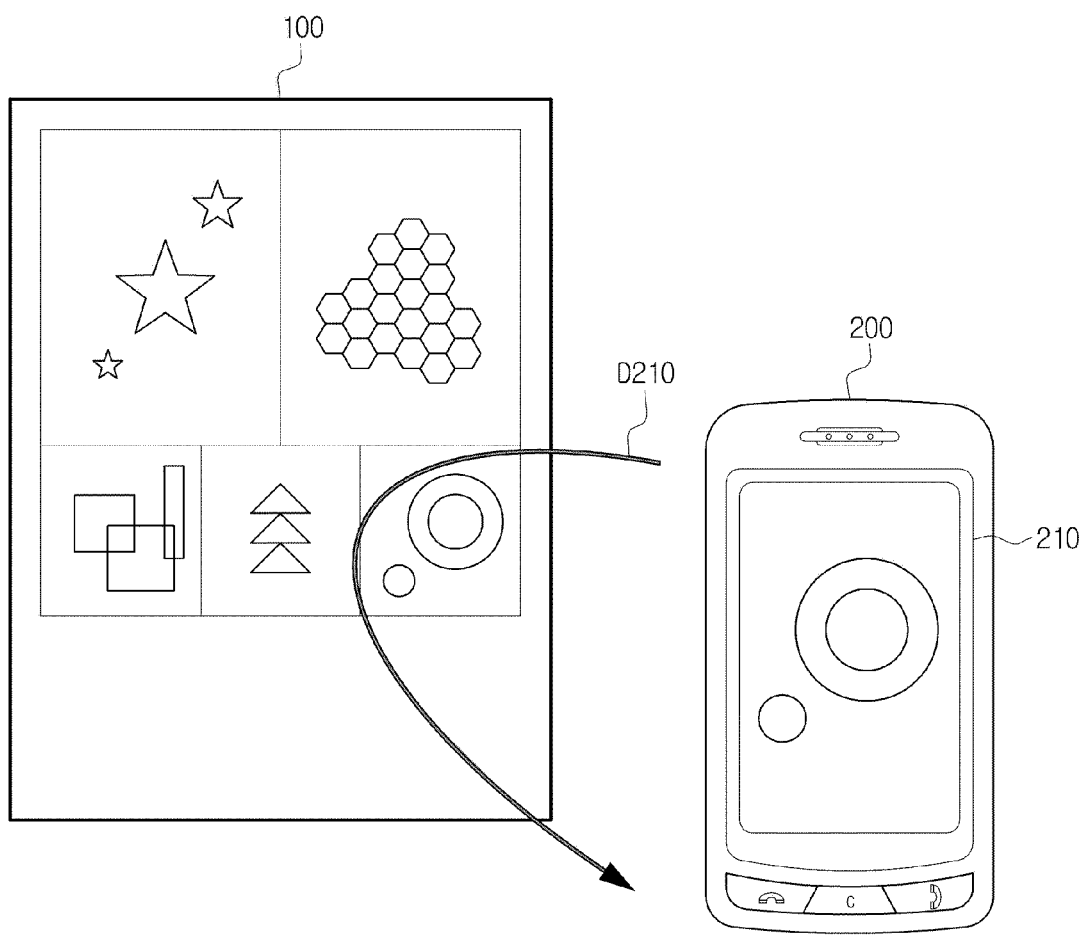
FIG. 7 is a view illustrating an item control motion of devices according to an exemplary embodiment.

FIG. 7 is a view illustrating an item control motion of devices according to an exemplary embodiment. A specific portion of the item being displayed in the first device 100 may be magnified and displayed in the second device 200. In case the item is an image, a linked service controller 220 of the second device 200 may magnify some of the image received from a selected area and display the magnified image on a display 210.

As shown in FIG. 7, the second device 200 may move along a moving path D210. The second device 200 takes and magnifies an image displayed on the screen of the first device 100 along the moving path D210. So that the user takes a desired area out of the image displayed in the first device 100, the user approximately positions the second device 200 in the relevant area. Then, the first device 100 identifies values of the class stored in each area and the position of the second device 200. Then, the first device 100 transmits at least some of image (i.e., the class corresponding to the approach information out of the image) of the position near the second device 200, and the second device 200 receives magnifies, and displays the transmitted portion of the image on the display 210 of the second device 200. The second device 200 may magnify the portion of the transmitted image to fit the display 210 of the second device 200.

Figure 8:
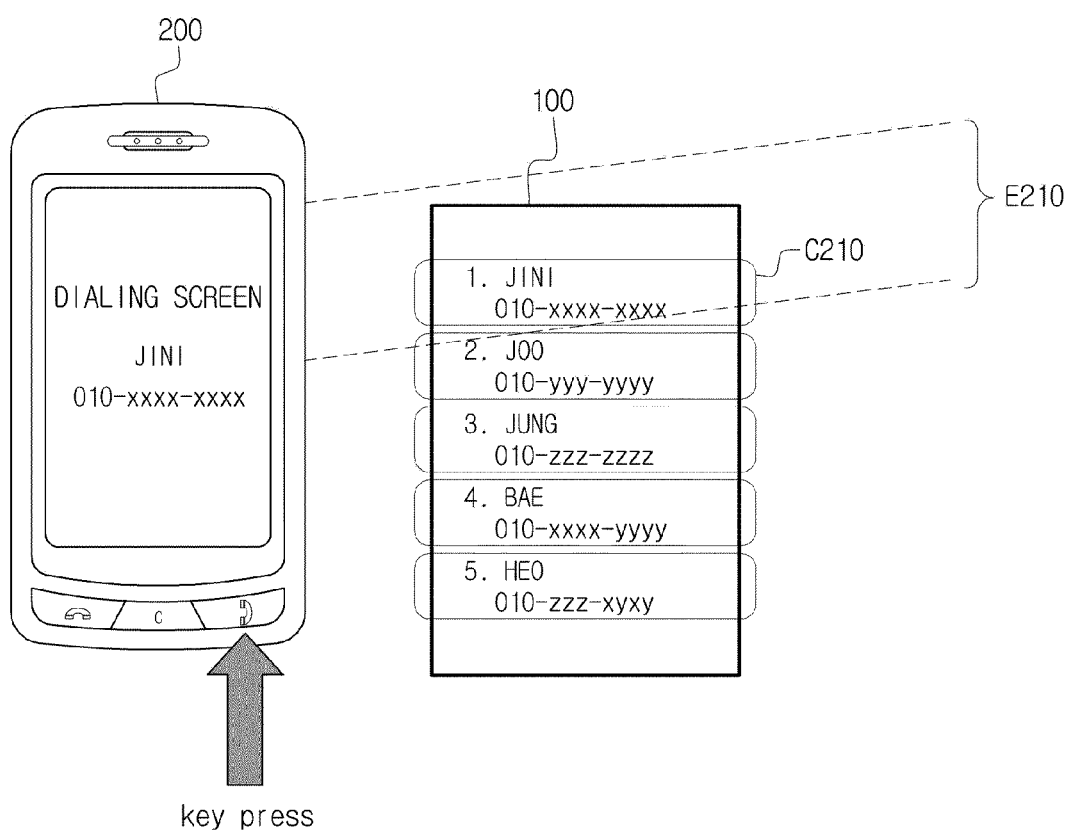
FIG. 8 is a view illustrating item control operation of devices according to an exemplary embodiment.

FIG. 8 is a view illustrating item control operation of devices according to an is exemplary embodiment. If the second device 200 approaches the first device 100 while a key event is performed, a linked service controller 220 of the second device 200 may link the class received from the first device 100 and the key event that is being performed and provide a linked service. The user may perform other event operations (e.g., key input) while approaching the item that is divided into different classes, so that the second device 200 may execute transmission or other related operations (e.g., dialing). For example, if a telephone number list is displayed in the first device 100, the user of the second device 200 may dial a telephone number C120 by selecting the telephone number C120 by moving the second device along a path E210 as shown in FIG. 8.

Referring to FIG. 8, the telephone number C210 may be a first class of the telephone number list (i.e., item) displayed on the screen of the first device 100.

In order to dial '1. JINI' out of the telephone numbers of the first device 100, the user of may move the second device 200 near the telephone number C210 on the screen of the first device 100. Thus, the user may receive the telephone number C210 and dial the telephone number C210 by performing an input, for example, by pressing a send key.

Figure 9:
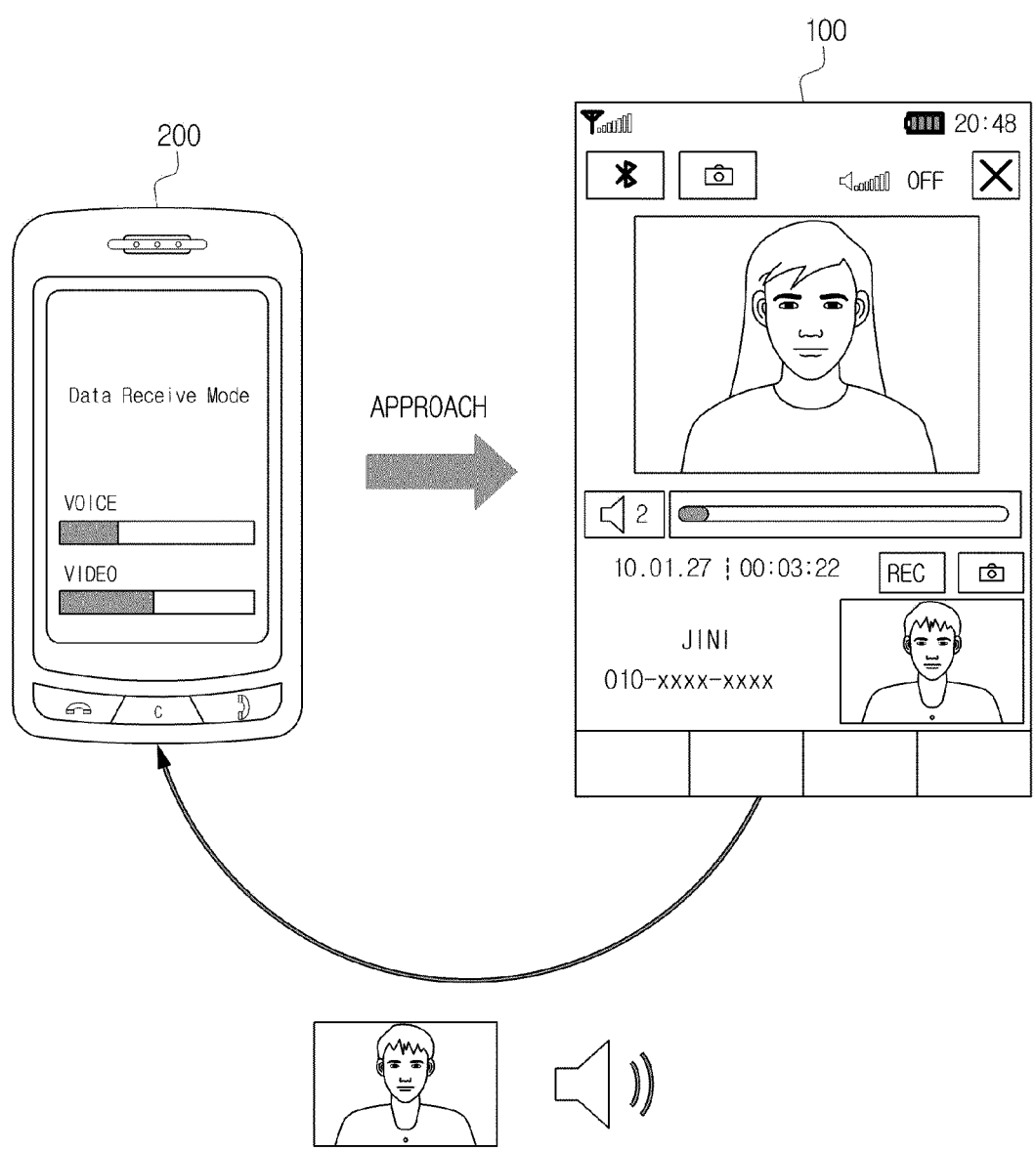
FIG. 9 is a view illustrating an item control operation of devices according to an exemplary embodiment.

FIG. 9 is a view illustrating an item control operation of devices according to an exemplary embodiment. If the second device 200 approaches the first device 100 during execution of an application, the operation controller 120 of the first device 100 may provide some content corresponding to approach information of the second device 200 out of the content linked to applications that are being executed. If an application is being executed in the first device 100, the linked service controller 220 of the second device 200 receives content corresponding to the selected area out of the content linked to the application that is being executed in the first device 100.

For example, if the first device 100 is executing a home shopping broadcast and displays various coupons in areas of lower portion of the screen of the first device 100, if the second device 200 approaches the first device 100, the first device 100 may identify the coupon that is nearest to the position of the second device 200 and transmit the identified coupon to the second device 200.

Referring to FIG. 9, the user may move the position of the second device 200 so as to make the second device 200 approach the first device 100 that is executing a video call application, so that image and audio data that are generated in the first device 100 during the video call may be stored in the second device 200.

Figure 10:
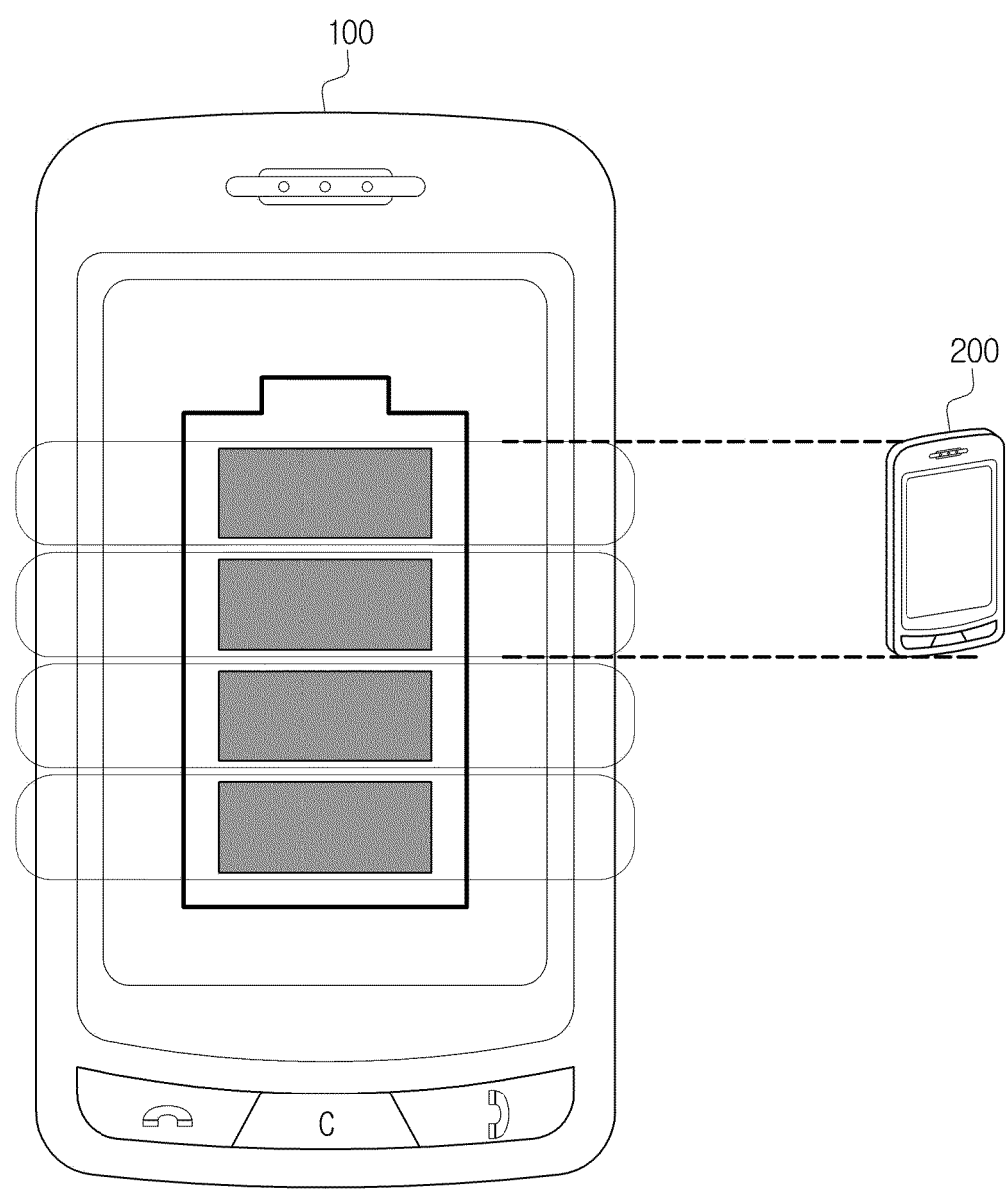
FIG. 10 is a view illustrating item control operations of device according to an exemplary embodiment.

FIG. 10 is a view illustrating item control operation of devices according to an exemplary embodiment. The linked service controller 220 of the second device 200 may receive information on a remaining amount of battery of the first device 100 using an approaching operation. Referring to FIG. 10, the user may move the second device 200 so that the information on the remaining amount of battery of the first device 100 is transmitted to the second device 200. The second device 200 may receive the information on the remaining amount of the battery of the first device 100 according to a gauge of the first device 100.

Figure 11:
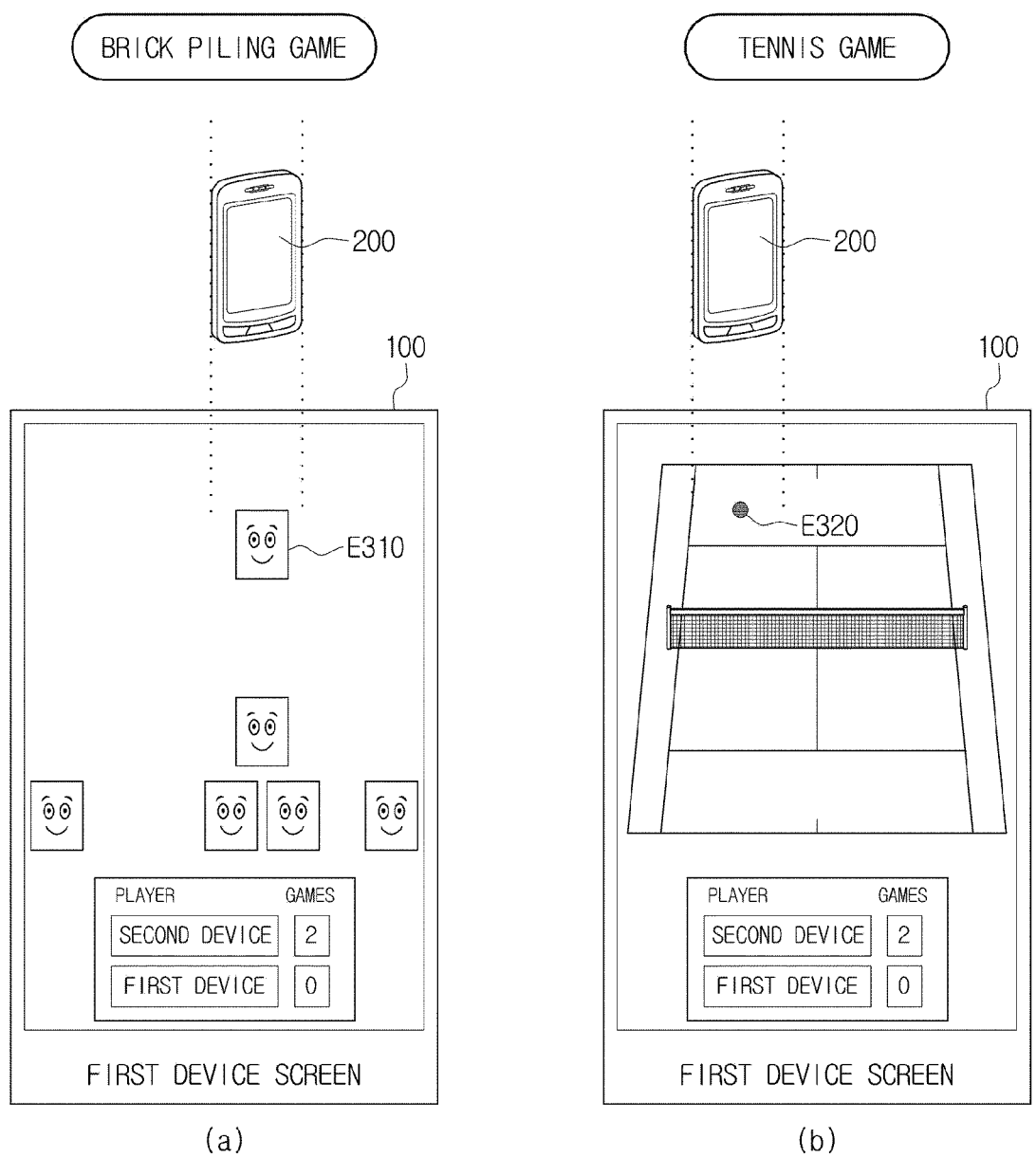
FIG. 11 is a view illustrating item control operations of devices according to an exemplary embodiment.

FIG. 11 is a view illustrating item control operations of devices according to an exemplary embodiment. The operation controller 120 of the first device 100 may change a display state of the classified items on the display 110 corresponding to the approach information of the second device 200. The screen displayed on the first device 100 may be changed depending on how the second device 200 is positioned on the screen displayed in the first device 100 or in an area displayed by the first device 100.

This method may be applied to a brick piling game or a tennis game, as shown in FIG. 11 (a) and FIG. 11 (b). If the screen of the first device 100 displays a brick piling game as shown in FIG. 11 (a), the user may control motion of bricks displayed on the first device 100 by changing the position of the second device 200. Further, the user may perform an operation of generating a brick by performing a key press event by pushing a function key in the second device 200. At this time, the first device 100 recognizes the class corresponding to the position of the second device 200 and generates a brick E310 in the relevant class area, and performs the piling operation of the brick E310.

When a tennis game is executed on the screen of the first device 100 as shown in FIG. 11 (b), the user may control the motion of a tennis ball E320 by changing the position of the second device 200. Further, the user may perform an operation of hitting the tennis ball by performing a key press event by pressing a function key on the second device 200. The tennis ball E320 is displayed on the class of the selected area matched to the position of the second device 200.

Referring to FIG. 11 (a) and FIG. 11 (b), if the first device 100 senses the position and key event of the second device 200, the first device 100 newly displays the brick E310 or the tennis ball E320 in the class of the area near the position of the second device 200 on the screen of the first device 100, and displays the motion of the relevant object (i.e., brick and tennis ball). Thus, it is possible to embody the games. Here, the first device 100 changes the display state of information displayed on the first device 100 according to the position, distance, and angle with which the second device 200 approaches the first device 100.

Figure 12:
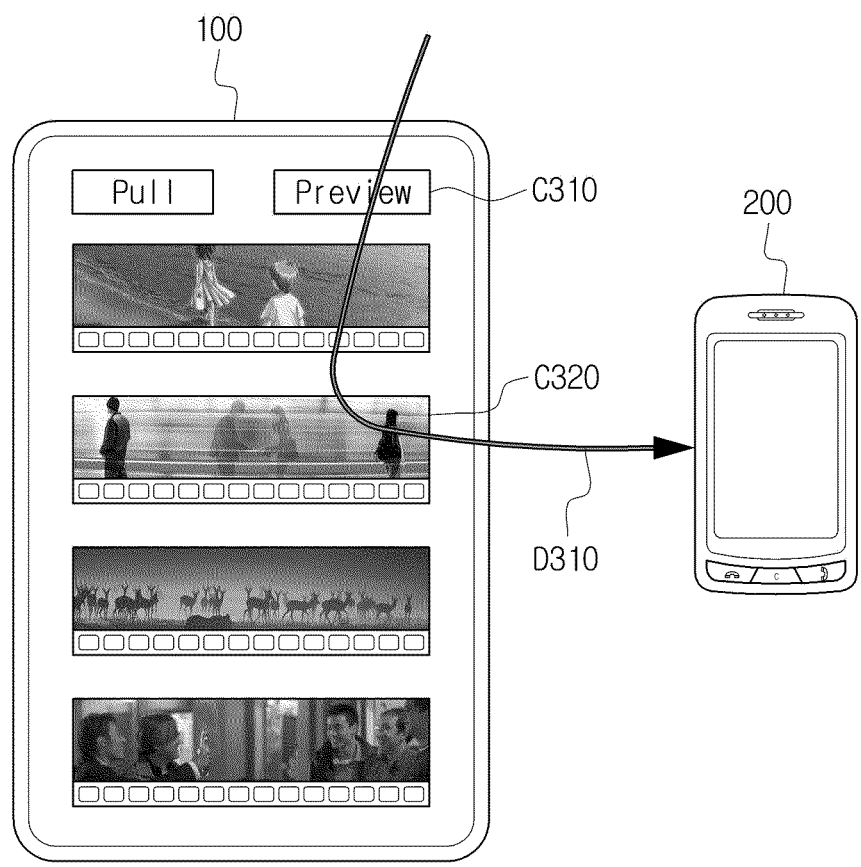
FIG. 12 is a view illustrating item control operations of devices according to an exemplary embodiment.

FIG. 12 is a view illustrating item control operations of devices according to an exemplary embodiment. The operation controller 120 of the first device 100 may execute the command matched to the class of the selected area corresponding to the approach information of is the second device 200. For example, when the items displayed on the first device 100 are matched to execution commands in each area, the linked service controller 220 of the second device 200 may execute the command matched to the class of the selected area.

Referring to FIG. 12, the first device 100 displays a movie list on a screen thereof. The user may play a preview image of a movie C320 by moving the second device 200 along a moving path D310 on which a preview button C310 and a portion where the movie C320 whose preview image is desired by the user are located. The movie C320 desired by the user and the command menu C310 to control the movie C320 are both selected by the moving the second device 200 along the moving path D310. Although described as selecting two items along the moving path D310, aspects are not limited thereto such that one, two, or more than to items may be selected by moving the second device 200 along a corresponding moving path.

As described above, it is possible to execute the operations, such as data transmission, copying a specific area of the data, and area magnification, by positioning the second device 200 in a specific area of the first device 100 that is displaying the item. Additionally, it is possible to embody operations, such as a change of display of the first device 100, according to the position of the second device 200.

Figure 13:
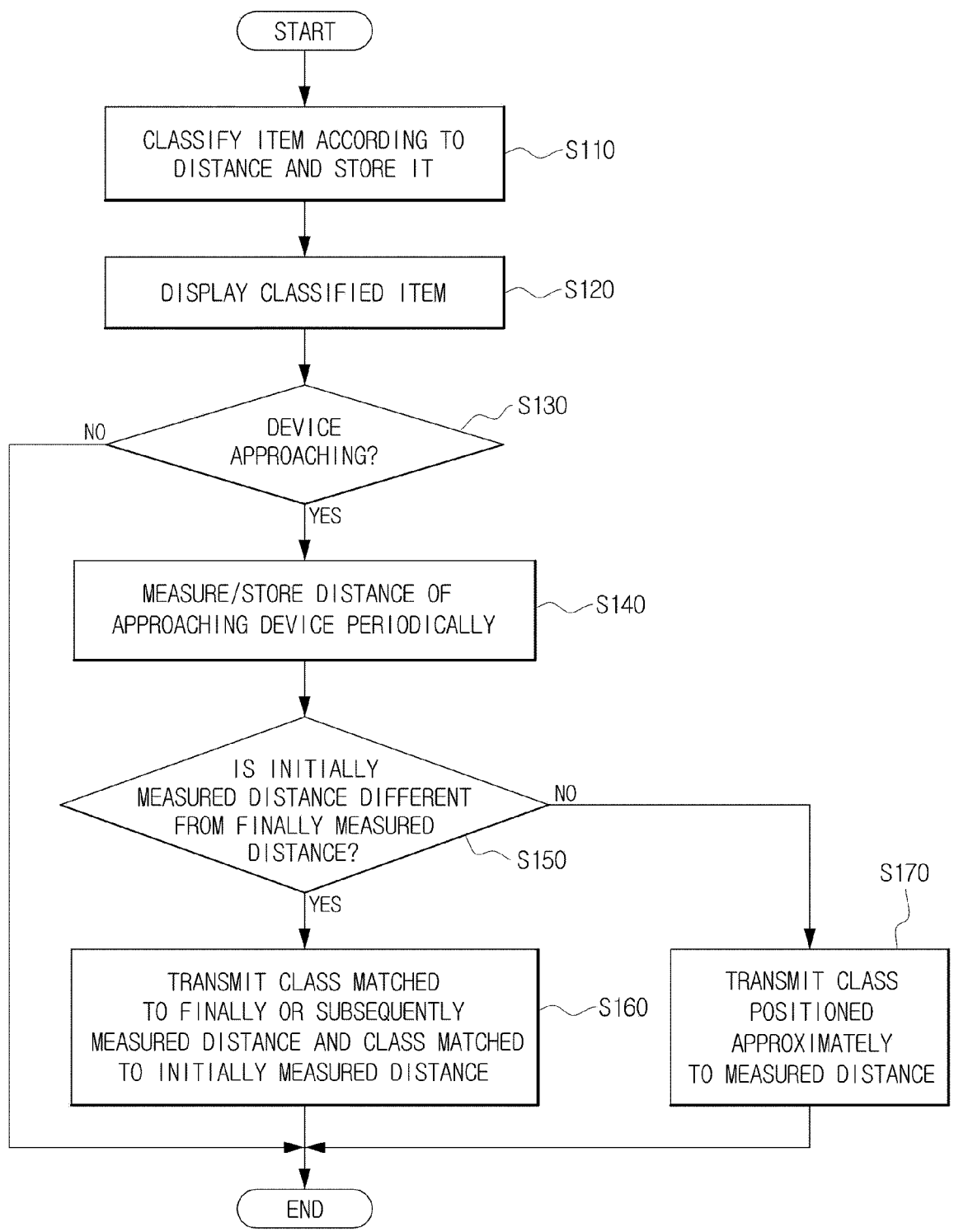
FIG. 13 is a flow chart illustrating a method for item control according to an exemplary embodiment.

FIG. 13 is a flow chart illustrating a method for item control according to an exemplary embodiment. First, the first device 100 classifies items to be displayed according to the distance thereof and stores the classified items (S110), and displays the classified items (S120). The first device 100 determines whether an approaching device, i.e., the second device 200, enters an area corresponding to or in which the classified items are displayed (S130). At this time, the user of the second device 200 moves the second device 100 near a desired class in order to select the class of the relevant item (S130).

The first device 100 matches approach information corresponding to a distance and a position of the second device 200 that approaches the first device 100 with the classified item (S140). The first device 100 may select a suitable class out of the entire area of the displayed item and transmit the selected class to the second device 200 (S170).

If the second device 200 approaches the first device 100 with an angle (slope) in order to receive multiple data, the first device 100 measures a first approaching distance of the second device 200, and measures the distance to the second device 200 at a time interval (for example, 0.1 second) several times (S140).

The first device 100 may determine the class selected by the user of the second device 200 using the first measured approaching distance and a finally or a subsequently measured approaching distance. That is, after a measurement task for a time has been completed, if the first measured distance is different from the finally or the subsequently measured distance (S150), the first device 100 determines that the second device 200 has requested multiple data, and then the first device 100 transmits multiple classes of data including a class matched with the finally measured distance and a class matched with the initially measured distance to the second device 200 (S160). If the initially measured distance is identical to the finally or the subsequently measured distance (S150), the class corresponding to the relevant measurement distance is selected and transmitted to the second device 200 (S170). After transmitting the item, the second device 200 informs the user that transmission of the item from the first device 100 has been completed.

Figure 14:
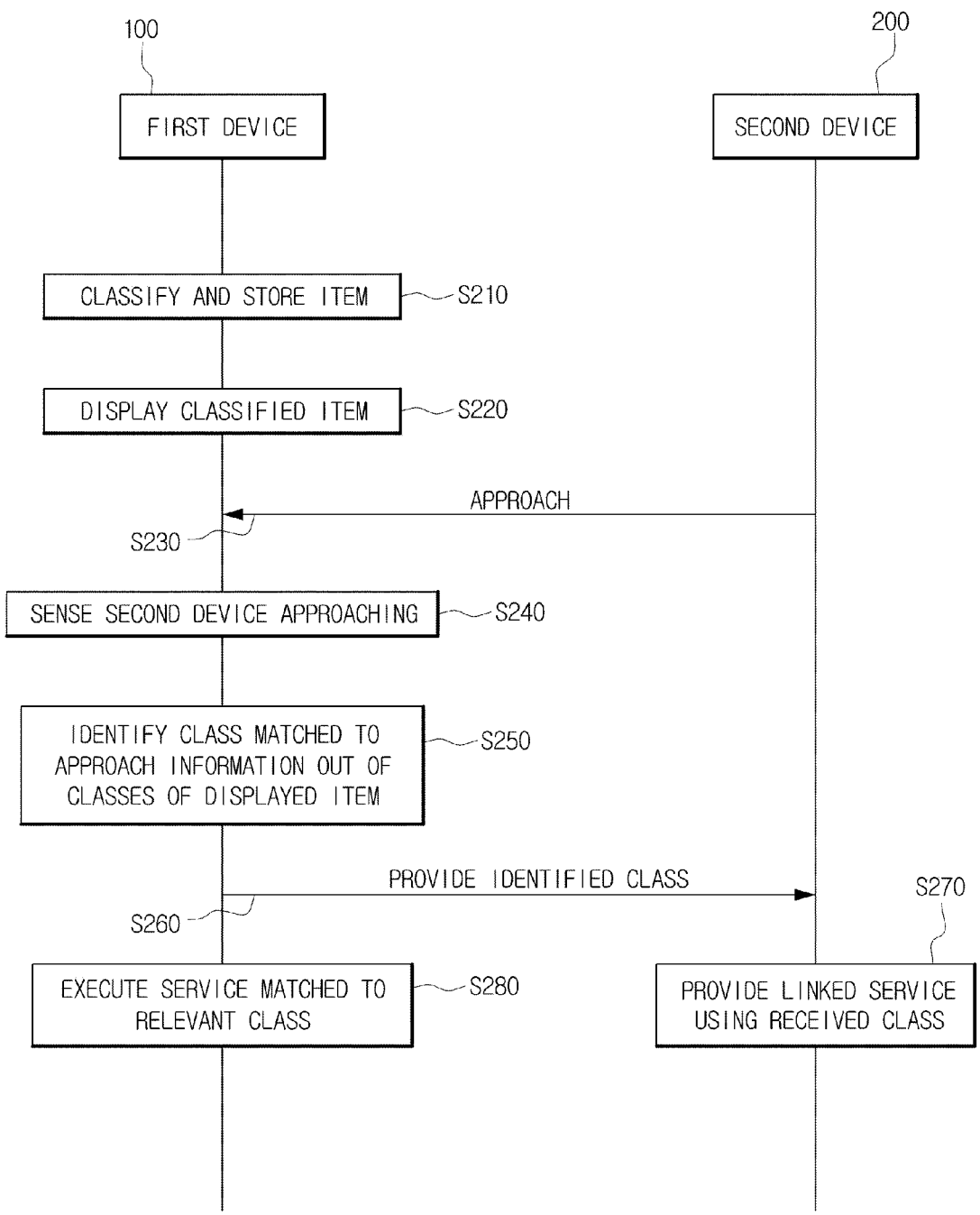
FIG. 14 is a flow chart illustrating a method for item control according to an exemplary embodiment.

FIG. 14 is a flow chart illustrating a method for item control according to an exemplary embodiment. First, the first device 100 divides a specific item into a plurality of classes, classifies and stores the classified item (S210), and the classified item is displayed is through the display 110 (S220).

If the user of the second device 200 moves the second device 200 toward the first device 100 in order to receive at least a portion of the classified item displayed on the first device 100 (S230), the first device 100 senses the second device 200 and obtains approach information of the second device 200 (S240). As the second device 200 approaches the first device 100, the approach information is generated in the first device 100.

Then, the first device 100 identifies the class of the selected area matched to the approach information of the second device 200 out of the entire area of the classified item (S250), and transmits one or more classes to the second device 200 through communication with the second device 200 (S260). The second device 200 receives the class of the selected area matched to the approach information out of the entire area of the classified item from the first device 100. The second device 200 may periodically generate a receiving response while receiving the class (not shown), or inform the first device 100 of a class reception completion after the completion of class reception (not shown). Subsequently, the second device 200 displays the received class on the display 210 (not shown), or provides a linked service using it (S270).

The first device 100 may identify the class matched to the approach information of the second device 200 and then provide services, such as changing a display state of a screen by applying the identification of the class matched to the approach information of the second device 200 (not shown), or executing an object command linked to the identified class (S280).

As described above, the item may be software data including file data, image data, video data, and audio data; a command object; an application screen component, and the like. Otherwise, physical data on a state of a device, such as a battery, may be employed as an item and classified on the screen of the first device 100.

The user may perform operations, such as data transmission, copy and magnification, by performing an operation, such as positioning the second device 200 in a specific area of the first device 100 that is displaying the classified item. Otherwise, linked services, such as changing a display state of screen of the first device 100 or executing the object command matched to the relevant class according to the position of the second device 200, and the like, may be provided.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A device, comprising:
   a display to display an item to be classified; and
   an operation controller to divide the item into a plurality of areas, to classify the item such that at least one class corresponds to an area of the item, to match a class of the classified item to an area of the item according to an approach information of an outside device, and to execute a service linked to the matched class,
   wherein the operation controller comprises:
   an proximity device recognizer to determine the approach information of the outside device, and
   a selected service executer to identify one or more classes matched with the approach information, and to execute the service linked to the identified one or more classes.

2. The device of claim 1, wherein the operation controller comprises:
   an item manager to classify the item into a plurality of classes corresponding to the plurality of areas.

3. The device of claim 1, wherein the selected service executer transmits the identified class to the outside device.

4. The device of claim 1, wherein the approach information of the outside device is used to select a class of the classified item and comprises one or more values corresponding to one or more of a position, a distance, an approach direction, a moving path, an angle, an entering speed, and an entering area of the outside device, respectively.

5. The device of claim 1, wherein the item is software data comprising one or more of file data, image data, video data, audio data, a command object, and an application screen component.

6. The device of claim 1, wherein the item is physical data of the device.

7. The device of claim 1, wherein the operation controller executes commands matched with the class corresponding to the approach information of the outside device.

8. The device of claim 1, wherein the classified item is content linked to an application, and the operation controller provides the class corresponding to the approach information of the outside device, if the outside device approaches while the application is executed.

9. The device of claim 1, wherein the operation controller changes a display state of the classified item on the display corresponding to the approach information of the outside device.

10. A device, comprising:
    an interface to select an area among a plurality of areas of a classified item displayed by an outside device, wherein the area is selected according to an approach motion towards the outside device as determined by the outside device, and to receive, from the outside device, an identified class matched to the selected area and the approach motion;
    a linked service controller to provide a linked service using the identified class corresponding to the approach motion; and
    a display to display the identified class.

11. The device of claim 10, wherein, if the classified item is an image, the linked service controller magnifies and displays the identified class of the image on the display.

12. The device of claim 10, wherein the linked service controller executes a command matched to the identified class.

13. The device of claim 10, wherein the linked service controller receives and reproduces the identified class of the classified item, or reproduces the class of the classified item if the item is video data or audio data.

14. The device of claim 10, wherein the linked service controller receives a portion of the content linked to an application corresponding to the identified class and provides the linked service if the application is being executed in the outside device.

15. The device of claim 10, wherein, if an approach to the outside device is made while a key event is performed, the linked service controller links the identified class with the key event and provides the linked service.

16. The device of claim 10, wherein the class corresponds to information on a remaining amount of battery of the outside device corresponding to the approach motion.

17. An item control system, comprising:
    a first device to select an area among a plurality of areas of an item by an approach motion towards a second device and to receive a class matched to the selected area of the item; and
    the second device to classify the item such that at least one class corresponds to an area of the item, to display the classified item, to determine the approach motion of the first device, to identify one or more classes matched with the approach motion, and to execute a service linked to the class matched to the selected area and the approach motion as the first device approaches the second device,
    wherein the classified item has at least one class corresponding to an area of the item.

18. The item control system of claim 17, wherein the second device provides the first device with the identified class.

19. A method for item control, comprising:
    classifying an item divided into a plurality of areas such that at least one class corresponds to an area of the item;
    displaying the classified item;
    determining, by a proximity device recognizer, approach information of an outside device as the outside device approaches;
    identifying one or more classes matched with the approach information;
    identifying an area of the classified item corresponding to the approach information of the outside device; and
    executing a service linked to the identified area and the identified one or more classes.

20. The method of claim 19, wherein the executing the service further comprises providing the outside device with a class of the item corresponding to the selected area.

21. The method of claim 19, wherein the item is software data, which comprises one or more of file data, image data, video data, audio data, a command object, and an application screen component.

22. The method of claim 19, wherein the classified item is information on physical data.

23. A method for item control, comprising:
    generating, by a proximity device recognizer, approach information on an outside device by approaching the outside device, the outside device displaying a classified item divided into a plurality of areas;
    receiving, from the outside device, an identified class corresponding to an area of the classified item based on the approach information; and providing a linked service according to the identified class corresponding to the approach information.

* * * * *